(12) United States Patent
Shirata

(10) Patent No.: US 8,064,099 B2
(45) Date of Patent: Nov. 22, 2011

(54) IMAGE FORMING APPARATUS, IMAGE FORMING METHOD, AND COMPUTER PROGRAM PRODUCT

(75) Inventor: Yasunobu Shirata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 782 days.

(21) Appl. No.: 12/124,689

(22) Filed: May 21, 2008

(65) Prior Publication Data

US 2009/0002732 A1    Jan. 1, 2009

(30) Foreign Application Priority Data

Jun. 28, 2007  (JP) ................. 2007-171136

(51) Int. Cl.
*G06F 15/00* (2006.01)
*G06F 3/12* (2006.01)
*G06K 15/00* (2006.01)

(52) U.S. Cl. .............. 358/1.9; 358/1.13; 358/1.18

(58) Field of Classification Search .............. 358/1.9, 358/1.13, 1.18; 399/82, 24, 10, 81, 27, 83
See application file for complete search history.

(56) References Cited

U.S. PATENT DOCUMENTS

| | | | |
|---|---|---|---|
| 7,349,638 B2 * | 3/2008 | Mima | 399/24 |
| 7,376,268 B2 | 5/2008 | Shirata et al. | |
| 7,565,088 B2 * | 7/2009 | Shibasaki | 399/81 |
| 2004/0114172 A1 | 6/2004 | Ohyama et al. | |
| 2004/0131263 A1 | 7/2004 | Kawamoto et al. | |
| 2004/0156076 A1 | 8/2004 | Togami et al. | |
| 2005/0213120 A1 | 9/2005 | Ohkawa et al. | |
| 2005/0243375 A1 | 11/2005 | Ohyama et al. | |
| 2005/0280857 A1 | 12/2005 | Sugiyama et al. | |
| 2006/0061809 A1 | 3/2006 | Murataka et al. | |
| 2006/0089133 A1 | 4/2006 | Yoshizawa et al. | |
| 2006/0215205 A1 | 9/2006 | Ohyama et al. | |
| 2007/0030504 A1 | 2/2007 | Kawamoto et al. | |
| 2007/0053009 A1 | 3/2007 | Ito et al. | |
| 2007/0058224 A1 | 3/2007 | Kawamoto et al. | |
| 2007/0064267 A1 | 3/2007 | Murakata et al. | |
| 2007/0070405 A1 | 3/2007 | Murakata et al. | |
| 2007/0070438 A1 | 3/2007 | Yoshida et al. | |
| 2007/0086068 A1 | 4/2007 | Ohkawa et al. | |
| 2007/0226692 A1 | 9/2007 | Nozawa et al. | |
| 2008/0037036 A1 | 2/2008 | Togami et al. | |

FOREIGN PATENT DOCUMENTS

| | | |
|---|---|---|
| JP | 2002-218214 | 8/2002 |
| JP | 2003-244365 | 8/2003 |
| JP | 2004-214794 | 7/2004 |

* cited by examiner

*Primary Examiner* — Charlotte M Baker
(74) *Attorney, Agent, or Firm* — Oblon, Spivak, McClelland, Maier & Neustadt, L.L.P.

(57) ABSTRACT

An image forming apparatus includes an attribute determining unit that determines an attribute concerning a hue of an original; a multi-page layout unit configured to arrange image data of a plurality of originals on a single sheet thereby obtaining a multi-page layout; and a cost calculating unit that calculates a printing cost of the originals. The cost calculating unit calculates the printing cost for the multi-page layouts of different combinations of the image data of the originals arranged by the multi-page layout unit based on an outcome of determination by the attribute determining unit.

7 Claims, 8 Drawing Sheets

FIG. 3
| ATTRIBUTE OF ORIGINAL | RATE |
|---|---|
| SINGLE-TONE | A |
| TWO-TONE | A |
| FULL COLOR (ALL EXCEPT SINGLE-TONE AND TWO-TONE) | B |
FIG. 4A
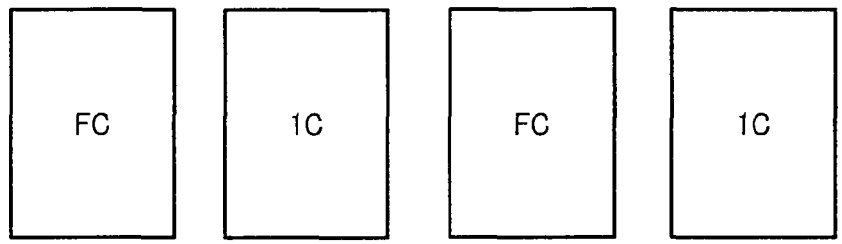
FIG. 4B
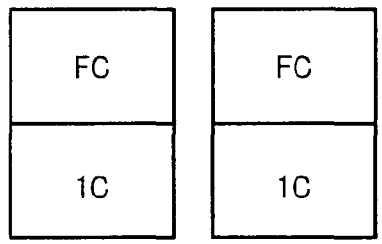
FIG. 4C
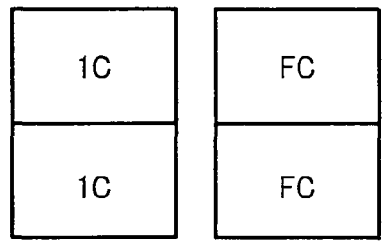

LAYOUT SEQUENCE OF ORIGINALS

2-IN-1 LAYOUT

4-IN-1 LAYOUT

MULTI-PAGE LAYOUT OUTPUT    1    2    3    4

| MULTI-PAGE LAYOUT OUTPUT | INDEX 1 | INDEX 2 |
|---|---|---|
| 1 | [(1), –] | [(3), (BLUE→BLACK)] |
| 2 | [(4), –] | [(5), –] |
| 3 | [(6), –] | [(8), (BLACK↔GREEN)] |
| 4 | [(2), –] | [(7), –] |

IMAGE FORMING APPARATUS, IMAGE FORMING METHOD, AND COMPUTER PROGRAM PRODUCT

CROSS-REFERENCE TO RELATED APPLICATIONS

The present application claims priority to and incorporates by reference the entire contents of Japanese priority document 2007-171136 filed in Japan on Jun. 28, 2007.

BACKGROUND OF THE INVENTION

1. Field of the Invention

The present invention relates to a technology for optimizing the expenses of the image forming process related to multi-page copying.

2. Description of the Related Art

An image forming process in image forming apparatuses, such as electrophotographic type copiers, is performed in the following manner. A light source, such as a lamp, illuminates a surface of an original. Light reflected from the surface of the original is guided to the surface of a photosensitive drum to form thereon a latent image corresponding to the image on the surface of the original. A developing device then adheres toner to the latent image on the photosensitive drum to convert the latent image into a visible image (or a toner image). A transfer device then transfers the visible image to a paper and a fixing device fixes the toner image on the paper.

Some image forming apparatuses have a function of multi-page copying. Multi-page copying includes forming scaled-down images of a plurality of originals on a single sheet of paper. Multi-page copying is economical, because it reduces the usage of paper.

Some color digital copiers are equipped with an automatic document feeder (ADF). An automatic document feeder (ADF) includes a document tray, and when a stack of originals is set in the document tray, originals set in the document tray are fed one by one to the color digital copier. Some color digital copiers are equipped with an auto-color-selection function. By using the auto-color-selection function, color digital copiers can automatically determines whether an original is a color original or a black-and-white original. In color digital copiers that are equipped with both the ADF and the auto-color-selection function, users merely need to set a mixed lot of color and black-and-white originals in the document tray of the ADF, and press a copy "start" button. The color digital copiers then perform appropriate processing depending on whether the original is a color document or black-and-white document.

Color printing is generally more expensive than black-and-white printing. The auto-color-selection function can be advantageous as the cost of printing will be commensurate with the type of processing selected according to the type of the original by the auto-color-selection function.

Color digital copiers also use great quantities of consumables and have very high running costs. Often users enter into a maintenance contract, and have to bear maintenance expenditure, which varies according to the print output. The maintenance expenditure also varies according to how much of the printing is to be done in color and how much in black-and-white.

The automatic black-and-white/color determination by the auto-color-selection function thus serves to assign rates according to the printing method selected based on whether the original is a color document or a black-and-white document in a mixed lot of originals.

A copying apparatus and a control method thereof are disclosed in Japanese Patent Application Laid-open No. 2003-244365. In the technology disclosed in Japanese Patent Application Laid-open No. 2003-244365, prior to starting a copying operation, the cost is calculated according to the number of pages to be output, whether it is going to be color or black-and-white output, and the paper size, the calculated cost is presented to the user, and the copying operation is performed only if the user gives a command. Different rates are set for a full color copy and a black-and-white copy. Similarly, in color digital copiers with two-tone copying functionality (such as producing copies in black and red) or single-tone copying functionality (for example, producing copies in a single color other than black such as red), different rates are set for two-tone copy and single-tone copy. In other words, the cost of single-tone copy such as black-and-white, single-tone (other than black) copy, and two-tone copy, which have less toner consumption, is set less than for full-color copy. However, auto-color-selection function can only recognize a black-and-white original and a color original, i.e., it can not differentiate between a color original, a two-tone original and, a single-tone (other than black) original. Therefore, when auto-color-selection function is selected, a two-tone original is treated as a color original, and the cost calculated will be according to a full-color rate. Thus, the cost calculated and presented to the user for the two-tone copy is erroneously high, even though the user has the option of whether or not to give the copy command. Further, if the auto-color-selection function is used in combination with multi-page copying when there is a mixed lot of black-and-white and color originals, color printing has to be initiated even if there is only one color original among the originals to be printed on a single sheet of paper. Barring the case where all the originals are in color, the calculated cost will always be higher than what should be. Faced with such a situation, some users do not mind the cost calculated based to full-color rate for the sake of image quality, while others prefer cost-saving.

A solution for the above problem is provided in Japanese Patent Application Laid-open No. 2004-214794. In the technology disclosed in Japanese Patent Application Laid-open No. 2004-214794, based on the determination result of the auto-color-selection function, copies of the originals of the same type are put together on a sheet of paper, thus producing copies of the black-and-white originals and the color originals on different sheets of paper. Thus, cost control is achieved by segregating black-and-white copying and color copying. However, in this case too, the auto-color-selection function can only recognize a black-and-white original and a color original, i.e., can not differentiate between a color original a two-tone original. Therefore, if there is a mixed lot of black-and-white originals and two-tone originals, the cost for the two-tone copy is calculated based on full-color rate, even if the copies of all the two-tone originals are made on a separate sheet of paper from the black-and-white ones.

SUMMARY OF THE INVENTION

It is an object of the present invention to at least partially solve the problems in the conventional technology.

According to an aspect of the present invention, there is provided an image forming apparatus including an attribute determining unit that determines an attribute concerning a hue of an original; a multi-page layout unit configured to arrange image data of a plurality of originals on a single sheet thereby obtaining a multi-page layout; and a cost calculating unit that calculates a printing cost of the originals. The cost calculating unit calculates the printing cost for the multi-page layouts of different combinations of the image data of the originals arranged by the multi-page layout unit based on an outcome of determination by the attribute determining unit.

According to another aspect of the present invention, there is provided an image forming method including determining an attribute concerning a hue of an original; arranging image data of a plurality of originals on a single sheet thereby obtaining a multi-page layout; and calculating a printing cost of the originals. The calculating includes calculating the printing cost for the multi-page layouts of different combinations of the image data of the originals arranged at the arranging based on an outcome of determination at the determining.

According to still another aspect of the present invention, there is provided a computer program product that includes computer program codes stored on a computer readable recording medium that when executed on a computer enables the computer to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of a table of rates referred to by a cost calculating unit shown in FIG. 1;

FIGS. 4A to 4C are schematics for explaining how multi-page layout cost is calculated;

DETAILED DESCRIPTION OF THE PREFERRED EMBODIMENTS

Exemplary embodiments of the present invention are described below with reference to the accompanying drawings.

Figure 1:
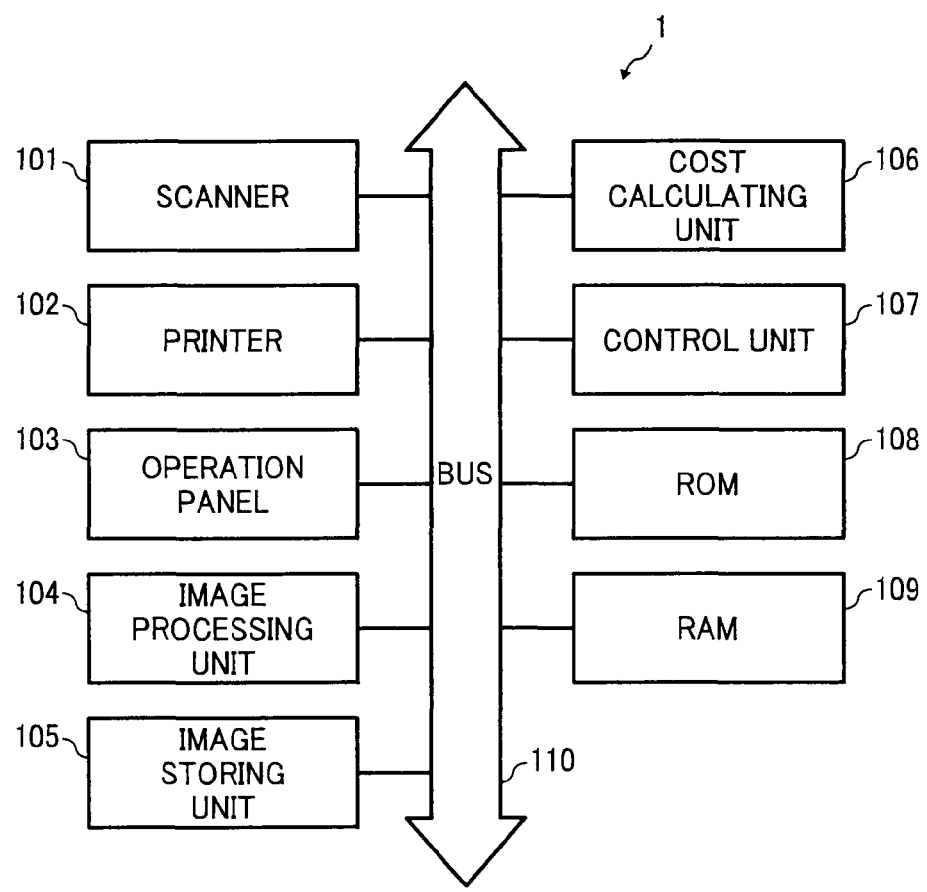
FIG. 1 is a block diagram of a copying apparatus according to a first embodiment of the present invention.

FIG. 1 is a block diagram of a copying apparatus 1 according to a first embodiment of the present invention.

The copying apparatus 1, representing an image forming apparatus, includes a scanner 101, a printer 102, an operation panel 103, an image processing unit 104, an image storing unit 105, a cost calculating unit 106, a control unit 107, a read-only memory (ROM) 108, and a random access memory (RAM) 109. A bus 110 interconnects all of the components given above.

The scanner (image reading unit) 101 is an image scanner that includes a charge coupled device (CCD), and scans an original to read an image thereon at a predetermined resolution.

The printer 102 is an electrophotographic recording device, and outputs (prints) the image of the original read by the scanner 101 to a recording sheet using cyan, magenta, yellow, and black toners.

The operation panel 103 includes various keys required for operating the image forming apparatus, a display unit (for example, liquid crystal display), and one or more indicators (for example, light-emitting diodes (LED)). The keys are used by a user for inputting various commands required for a copying process or a recording process using a multi-page copying function by the image forming apparatus. The multi-page copying function is described in detail later. The display unit displays information such as the description of the commands entered using the keys or notification or information to the operator from the image forming apparatus.

The image processing unit 104 performs image processing such as attribute determination of image data, processes related to changing the magnification, and color conversion for printer output. In addition, the image processing unit 104 performs image processing required for a multi-page recording process described later.

The image storing unit 105 is a RAM or a hard disk, and stores therein the image data read by the scanner 101 and processed by the image processing unit 104.

The cost calculating unit 106 calculates the cost of printing by the printer 102, and outputs the cost to the control unit 107.

The ROM 108 stores therein computer programs and a multi-page processing program required to control the image forming apparatus and various data required for executing these computer programs.

The RAM 109 stores therein various parameters required by the control unit 107 and serves as a work memory for the control unit 107.

The control unit 107 controls, based on the computer programs in the ROM 108 and using the RAM 109 as the work memory, the various components of the image forming apparatus. In addition, the control unit 107 performs the multi-page copying function.

The first embodiment relates to modifying a multi-page layout so as to obtain copies inexpensively. A process flow of multi-page copying is described blow with reference to FIG. 1.

The user places a stack of originals on the document tray of the scanner 101, selects pages per sheet, and operates a "multi-page copy" button (not shown) and a "start" button (not shown) on the operation panel 103.

The control unit 107 receives the input of data from the operation panel 103 such as the number of pages per sheet (for example, 2 or 4), and issues appropriate commands to various components of the image forming apparatus.

The scanner 101 reads the originals one by one, and forwards the read image data to the image processing unit 104.

Figure 2:
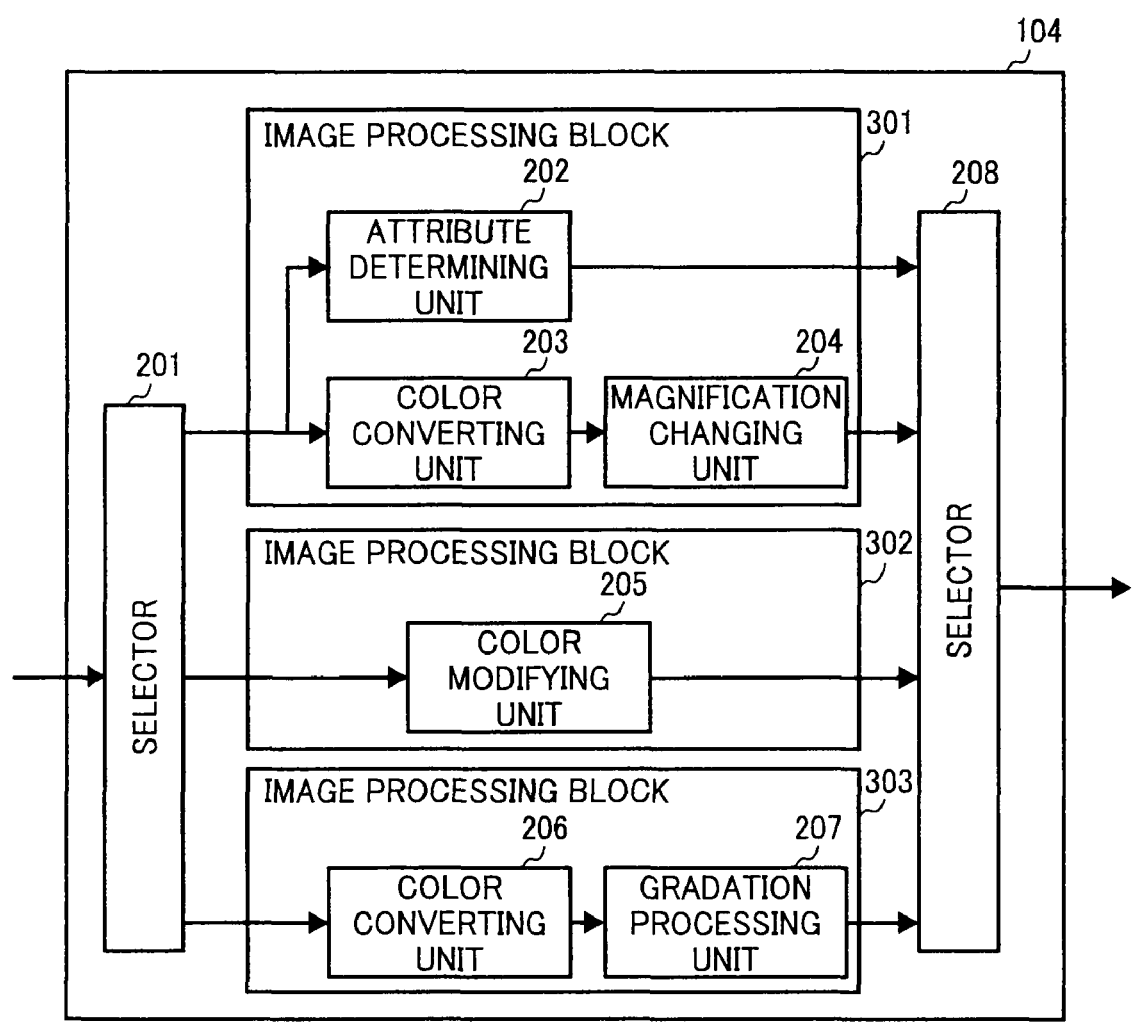
FIG. 2 is a detailed block diagram of an image processing unit shown in FIG. 1.

FIG. 2 is a detailed block diagram of the image processing unit 104.

The image processing unit 104 includes three image processing blocks 301 to 303, and two selectors 201 and 208. The selector 201 controls to which of the image processing blocks 301, 302, and 303 the image data received by the image processing unit 104 is to be channeled. The selector 201 first channels the image data received from the scanner 101 to the image processing block 301.

The image processing block 301 includes an attribute determining unit 202, a color converting unit 203, and a magnification changing unit 204. The attribute determining unit 202 determines the number of constituent colors and the hue of the constituent colors (for example, red, green, blue, cyan, magenta, yellow, and black) included in the image data. For example, if the original contains text in black, the attribute determining unit 202 determines that it is a single-tone original, if the original contains text in black and red, the attribute determining unit 202 determines that it is a two-tone original, and if the original contains three or more colors, the attribute determining unit 202 determines that it is a full-color original.

The original can contain a two-tone picture instead of two-tone text. The original can contain a single-tone picture instead of a single-tone text.

The attribute determining unit 202 outputs the number of colors and the hue to the selector 208. The selector 208 forwards the number colors and the hue to the cost calculating unit 106.

The color converting unit 203 converts the image data from a device-dependent color space to a standardized color space (for example RGB space), and forwards the image data to the magnification changing unit 204.

The magnification changing unit 204 changes the magnification of the image data according to whether it is a 2-in-1 layout (i.e., two images on one sheet) or a 4-in-1 layout (i.e., four images on one sheet). The magnification changing unit 204 outputs the magnification-changed image data to the selector 208 and the selector 208 stores the magnification-changed image data in the image storing unit 105.

The cost calculating unit 106 calculates the cost of printing. The cost calculating unit 106 calculates total cost of printing based on multi-page layout information (information concerning whether the layout is a 2-in-1 layout or a 4-in-1 layout) received from the operation panel 103, and the attribute data received from the image processing unit 104.

The total cost of the multi-page output is the sum of cost of printing all the images on one sheet of paper. The cost of printing all the images on one sheet of paper is determined by the number of colors in the images. For example, irrespective of whether the color in the original is black or red, the cost of the output will be the same for both black and red. Similarly, irrespective of whether the colors in the original are black and red or blue and red, the cost of the output will be the same for both black and red, and blue and red. The same applies for full color output, the cost being the same for any three or more colors.

FIG. 3 is a table of rates referred to by the cost calculating unit 106. As shown in FIG. 3, a single-tone copy and a two-tone copy have the same rate, which is a single-color rate A, and a copy of three or more colors has a full-color rate B, where B>A.

FIGS. 4A to 4C are schematics for explaining how multi-page layout cost is calculated.

Suppose that a stack of four originals shown in FIG. 4A is to be output in a 2-in-1 layout (two originals per sheet). Of the four originals, two are full color (FC) and two are single color (1C). The sequence in which the originals are stacked is as shown in FIG. 4A.

Assume that the originals are printed in the manner as shown in FIG. 4B, that is FC and 1C on a first sheet, and FC and 1C on a second sheet. In this example, the cost is determined by the number of colors to be output on a single sheet, and the number of colors is determined based on the attributes of the original. As the output on both the first sheet and second sheet as per the stacking sequence is FC and 1C, the rate will be determined based on FC, which is B. Therefore, the total cost for the output of the two sheets will be (B+B).

Assume now that the originals are printed in the manner as shown in FIG. 4C. In this example, because the output on the first sheet is 1C and 1C, the rate of single-tone or at the most two-tone copying, which is A, is applicable. The output on the second sheet is FC and FC and hence the rate of full-color copying, which is B, is applicable. The total cost thus would be (A+B), which is less expensive than for the example shown in FIG. 4B by (B−A).

The examples given above are simple ones. Even if a large number of originals are involved, it is possible to determine a way of copying by reshuffling the originals based on the attributes of all the originals and the number of originals to be output on a single sheet, which costs less than when copying in the stacking sequence of the originals.

Let us suppose that the number of pages per sheet is N (N=2 in a 2-in-1 layout), and the number of originals for which rate A is applicable (single-tone and two-tone originals) is $M\_a$, and the number of originals for which rate B is applicable (full-color originals) is $M\_b$. If ($M\_a/N \geqq 1$), a cheaper output cost is possible by assembling all the originals for which rate A is applicable on a single sheet. The quotient of division of $M\_a$ by N (which is supposed as S) will be the number of sheets required for outputting the groups of originals for which rate A is applicable. The quotient of division of $M\_b$ by N (which is supposed as T) will be the number of sheets required for outputting the groups of originals for which rate B is applicable.

The calculation of cost for arranging in multi-page layout the remaining originals ($M\_a+M\_b-(S+T)\times N$) will be different based on whether or not ($M\_a+M\_b-(S+T)\times N$) is divisible by N. A fractional quotient in a 2-in-1 layout indicates that there will only be one page left to be arranged on the last sheet. A fractional quotient in an N-in-1 layout indicates that there will be (N−1) or less pages left to be arranged on the last sheet.

(1) A whole number quotient means that the remaining number of originals Z (=$M\_a+M\_b-(S+T)\times N$) is divisible by N. The cost of copying the remaining originals will be ($Z/N\times B$), and the total cost will be ($S\times A+T\times B+Z/N\times B$).

(2) A fractional number quotient means that the remaining number of originals Z (=$M\_a+M\_b-(S+T)\times N$) is not divisible by N. The number of originals remaining (assumed to be U) is the quotient of Z by N. In other words, (U=Z/N). Methods for calculating printing cost for multi-page layout will be different for $U \leqq (M\_a-S\times N)$ and $U>(M\_a-S\times N)$.

(2-1) If $U \leqq (M\_a-S\times N)$, the multi-page layout will fall under rate A, and the rate applicable to the multi-page layout corresponding to the fraction will be rate A. Rate B automatically becomes applicable to multi-page layout of the last remaining originals (Z−U). Therefore, the total multi-page layout cost would be ($S\times A+T\times B+A+(Z-U)/N\times B$).

(2-2) If $U>(M\_a-S\times N)$, the multi-page layout will not fall under rate A, and therefore the rate applicable to the multi-page layout corresponding to the fraction will be rate B. Rate B automatically becomes applicable to multi-page layout of the last remaining originals (Z−U). Therefore, the total multi-page layout cost would be ($S\times A+T\times B+B+(Z-U)/N\times B$).

Figure 5:
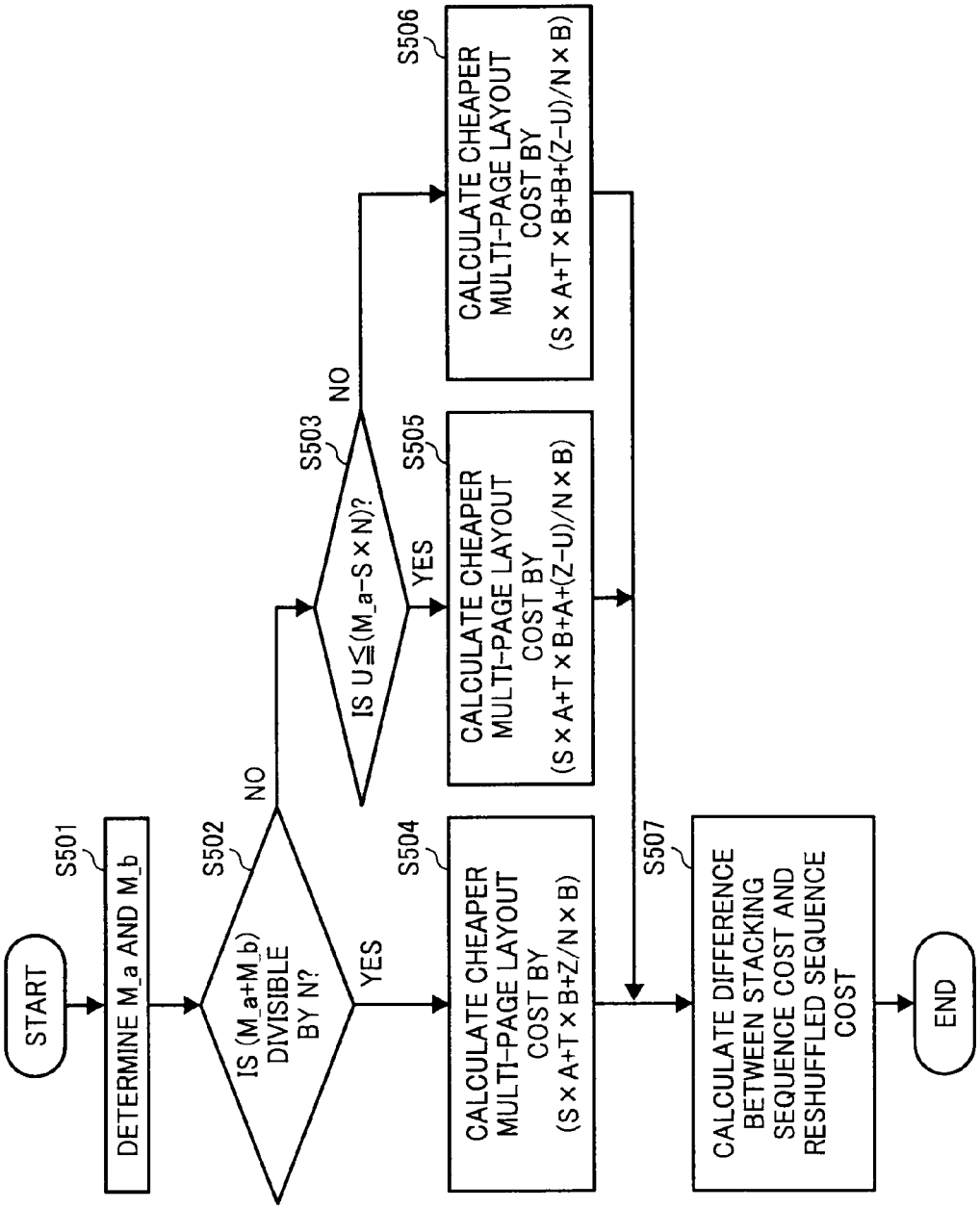
FIG. 5 is a flowchart of a multi-page layout cost calculation method implemented by the cost calculating unit.

FIG. 5 is a flowchart of the multi-page layout cost calculation method implemented by the cost calculating unit 106 when calculating printing cost for a multi-page layout. At Step S501, the cost calculating unit 106 determines the number of originals for which rate A is applicable ($M\_a$) and the number of originals for which rate B is applicable ($M\_b$) based on the originals attribute determination result received from the image processing unit 104. At Step S502, the cost calculating unit 106 determines whether the total number of originals ($M\_a+M\_b$) is divisible by N, which is a multi-page condition (N-in-1 layout) received from the operation panel 103. If (M_a+M_b) is divisible by N (Yes at Step S502), the system control proceeds to Step S504 where the cost calculating unit 106 calculates the multi-page layout cost after reshuffling by (S×A+T×B+Z/N×B), where S is the quotient of M_a/N, T is the quotient of M_b/N, and Z=(M_a+M_b-(S+T)×N).

If at Step S502 it is determined that (M_a+M_b) is not divisible by N (No at Step S502), the system control proceeds to Step S503 where the cost calculating unit 106 checks whether the remaining number of originals U is ≦(M_a-S×N). If U≦(M_a-S×N) is satisfied (Yes at Step S503), the system control proceeds to Step S505 where the cost calculating unit 106 calculates the multi-page layout cost by (S×A+T×B+A+(Z-U)/N×B). If U≦(M_a-S×N) is not satisfied (No at Step S503), the system control proceeds to Step S506 where the cost calculating unit 106 calculates the multi-page layout cost by (S×A+T×B+B+(Z-U)/N×B).

After completion of calculation of cost at either Step S502, S505, or S506, at Step S507, the cost calculating unit 106 calculates the difference between the multi-page layout cost for the stacking sequence of the originals (hereinafter, "stacking sequence cost") and the multi-page layout cost for the reshuffled sequence of the originals (hereinafter, "reshuffled sequence cost"). Presence of cost difference between the two indicates that there is a way of performing multi-page copying which is less expensive than the multi-page copying done in the stacking sequence of the originals.

If there is a cost difference, the cost calculating unit 106 notifies the difference in the multi-page layout cost as well as the sequence of the originals corresponding to the cheaper cost to the control unit 107. If there is no cost difference, the cost calculating unit 106 notifies the normal stacking sequence to the control unit 107.

Upon receiving the notification regarding a less expensive multi-page layout from the cost calculating unit 106, the control unit 107 reads the image data stored in the image storing unit 105, arranges them in multi-page format according to the sequence corresponding to the cheaper cost, and displays a preview of the image data in the form the thumbnails in a display area of the operation panel 103.

Figure 6:
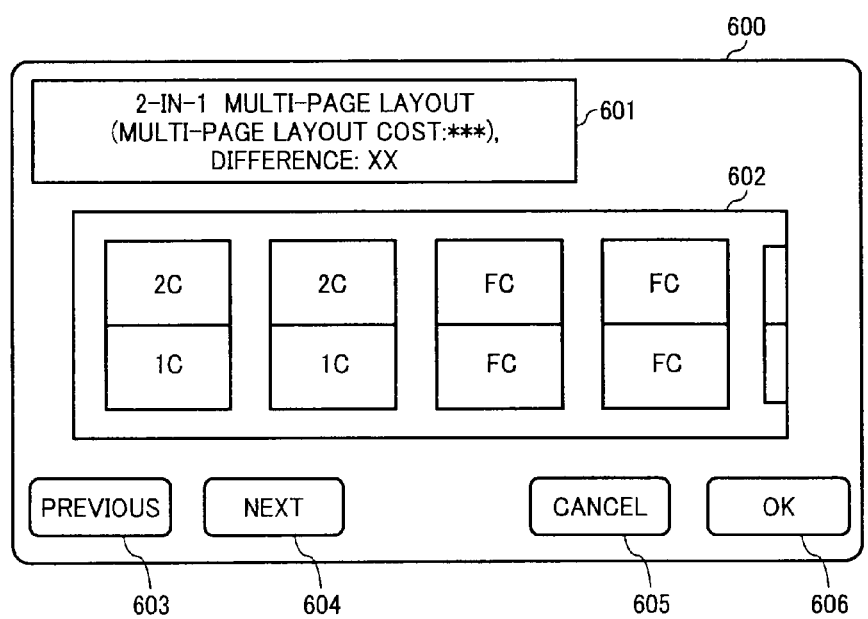
FIG. 6 is a drawing of a preview screen displayed in a display area of an operation panel shown in FIG. 1.

FIG. 6 is an example of a preview screen that could be displayed in the display area of the operation panel. The thumbnail images of 2-in-1 layout are displayed in a preview window 602 in a preview screen 600 of the operation panel 103. All the sheets can be viewed by pressing a "previous" button 603 or a "next" button 604. The reshuffled sequence cost and the difference between the stacking sequence cost and the reshuffled sequence cost are displayed on a cost display unit 601. Thus, just by glancing at the preview screen the user can readily get information about the final multi-page layout and the cost thereof.

If acceptable, the user can go ahead with copying by pressing an "OK" button 606. If not, by pressing a "cancel" button 605 the user can cancel the operation.

If the user presses the "OK" button 606, the control unit 107 reads the image data from the image storing unit 105 in the sequence corresponding to the less expensive multi-page layout and forwards the image data in the same sequence to the image processing unit 104. A color converting unit 206 of the image processing block 303 shown in FIG. 2 converts the color space of the image data from the standardized color space to a color space suited to the printer 102, and a gradation processing unit 207 performs gradation processing. The gradation processing unit 207 forwards the image data to the selector 208, and the selector 208 forwards the image data to the printer 102. The image data is transferred to the recording sheets by the printer 102.

If the user presses the "cancel" button 605, the control unit 107 reads the image data from the image storing unit 105 in the sequence corresponding to the image reading sequence multi-page layout and forwards the image data in the same sequence to the image processing unit 104. The subsequent process flow is similar to that when the "OK" button 606 is pressed.

Thus, when performing multi-page copying of the originals, the cost of multi-page copying is calculated based on the attributes of the originals, and the less expensive multi-page layout and the cost thereof are displayed on the preview screen, enabling the user to select the less expensive multi-page copying.

The calculation method described in the first embodiment involves changing sequence in which a mixed stack of single-tone and full color originals are arranged on a sheet to make the multi-page layout less expensive. In a second embodiment of the present invention described below, a calculation method involving performing multi-page layout and converting colors to make the multi-page layout less expensive is employed.

In the first embodiment, a less expensive multi-page layout is arrived at by reshuffling the sequence of the originals so that they are categorized according to their rates right up to the last remaining original. In a mixed stack of single-tone, two-tone, and full color originals, this method of reshuffling the sequence of the originals alone is not adequate to arrive at a less expensive multi-page layout.

Figure 7A:
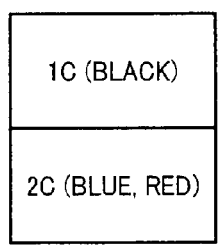
FIGS. 7A and 7B are schematics for explaining a second embodiment of the present invention.

Suppose that a mixed stack of single-tone and two-tone originals are to be arranged in a 2-in-1 layout, and that the colors in the single-tone originals are black and white and in the two-tone originals are red and blue. The multi-page layout thus will include three colors, namely, black, red, and blue, as shown in FIG. 7A. As the cost per sheet is calculated according to the rate, and the rate depends on the number of colors to be printed per sheet, and as three colors are to be printed per sheet, the full-color rate will be applicable in this case.

Figure 7B:
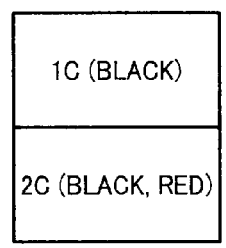

Therefore, when the multi-page layout includes a combination of single-tone and two-tone originals on a sheet, thus taking up the color output requirement for the sheet to three or more, color conversion is performed as shown in FIG. 7B, i.e., blue portions in the original are converted to black, so that the color output requirement is limited to two and the single-color rate becomes applicable. The decision regarding whether color conversion is required in the multi-page layout is taken by the cost calculating unit 106 after the multi-page layout cost is calculated.

Figure 8:
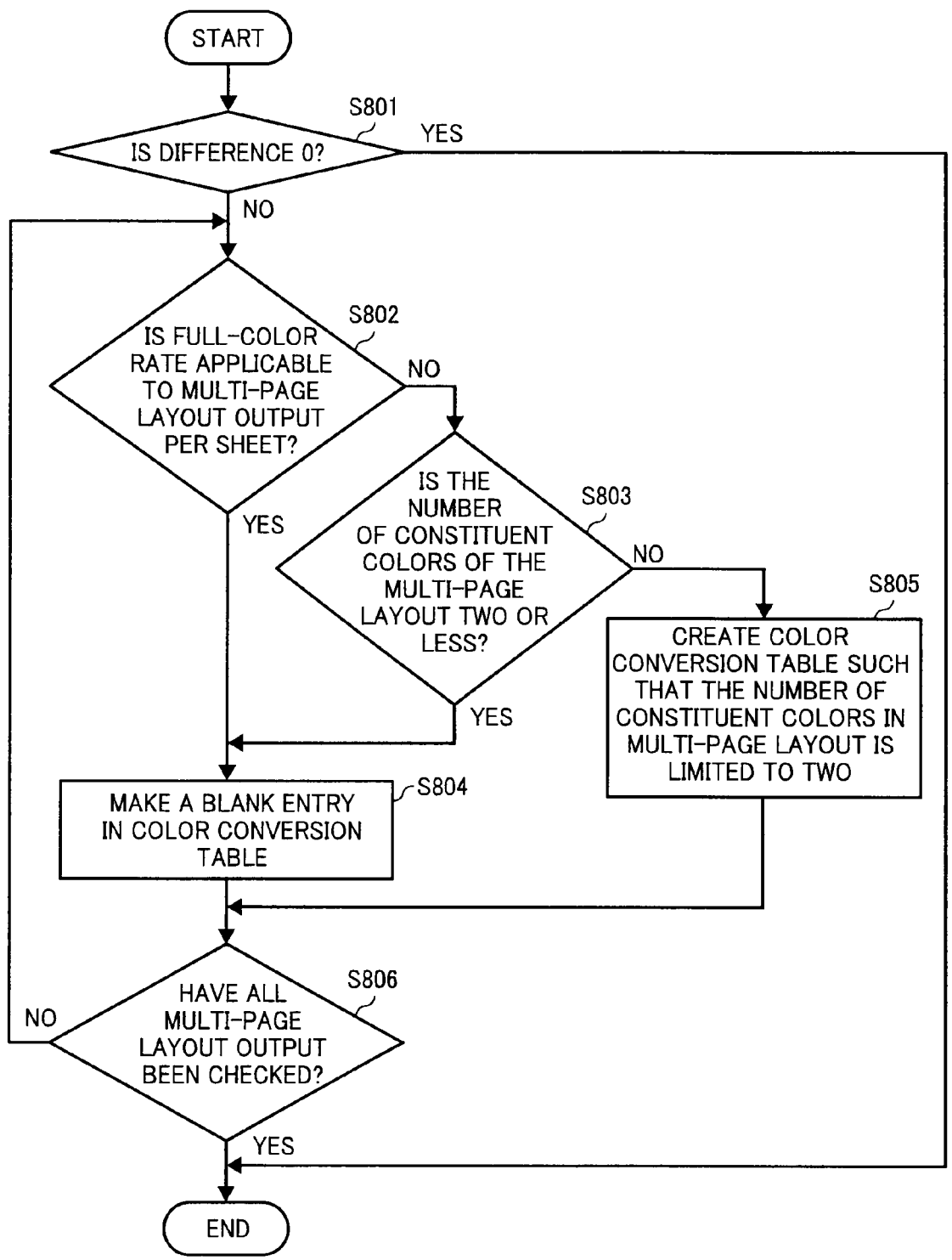
FIG. 8 is a flowchart of a process according to the second embodiment.

A copying apparatus according to the second embodiment has the same configuration as the copying apparatus 1 according to the first embodiment. FIG. 8 is a flowchart of a process for obtaining information for color conversion based on the sequence of the originals arranged so as to be inexpensively output and the attributes of the originals. At Step S801, the cost calculating unit 106 checks whether there is a difference between the stacking sequence cost and reshuffled sequence cost is zero. If the cost difference is not zero (No at Step S801), the system control proceeds to Step S802. If the cost difference is zero (Yes at Step S801), the process is ended and the multi-page layout is carried out as per the stacking sequence of the original.

At Step S802, the cost calculating unit 106 checks whether the full-color rate is applicable to the multi-page layout output per sheet. If so (Yes at Step S802), the system control proceeds to Step S804; because, there is no need to perform color conversion before outputting the multi-page sheet. If the full-color rate is not applicable to the multi-page layout on the sheet (No at Step S802), the system control proceeds to Step S803; because, as there is a necessity for creating a color conversion table based on the number of constituent colors before outputting the multi-page sheet. At Step S803, the cost calculating unit 106 determines if the number of constituent colors is two or less.

If the number of constituent colors is two or less (Yes at Step S803), the system control proceeds to step S804; because, the rate applicable to the sheet will be the single-color rate. If the number of constituent colors is greater than 2 (No at Step S803), the system control proceeds to Step S805 where the cost calculating unit 106 creates a color conversion table required for color conversion to bring down the constituent colors to two in order to avoid full-color rate. After creation of the color conversion table, the system control proceeds to Step S806.

As there is no need to perform a color conversion (Yes at Step S802 and Step S803), the cost calculating unit 106 makes a blank entry in the color conversion table at Step S804, and the system control proceeds to Step S806. At Step S806, the cost calculating unit 106 checks whether all the multi-page layout outputs have been checked. If any multi-page layout output remains unchecked, the system control is returned to Step S802 and Steps S802 to S805 are repeated. Once all the multi-page outputs are checked, the process is ended.

Figure 9:
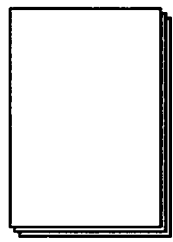
FIG. 9 is a drawing of output layouts according to the second embodiment.
Figure 9:
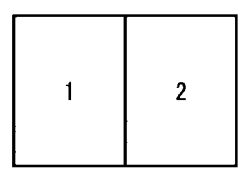
Figure 9:
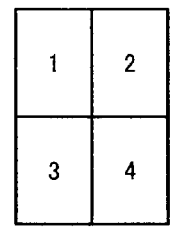
Figure 10A:
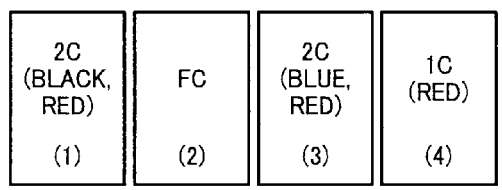
FIGS. 10A and 10B are schematics for explaining creation of a color conversion table according to the second embodiment.
Figure 10A:
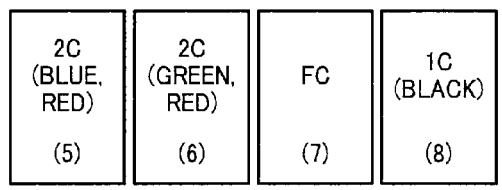
Figure 10B:
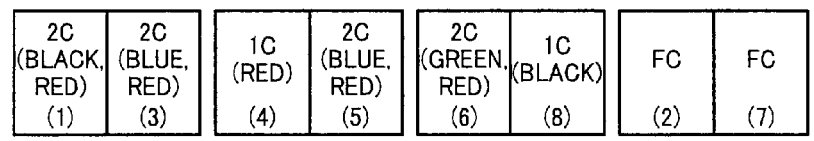
Figures 11, 12:
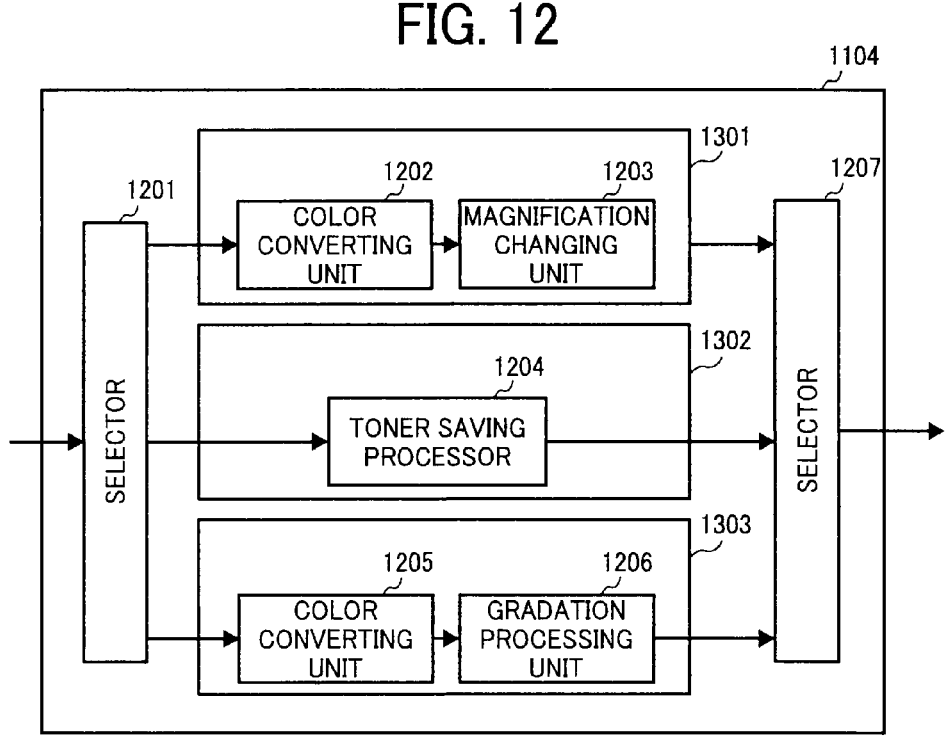
FIG. 11 is an example of the color conversion table.
FIG. 12 is a block diagram of an image processing unit according to a third embodiment of the present invention.

In creating the color conversion table at Step S805, the cost calculating unit 106 decides which color from the multi-page layout is to be converted. FIG. 9 is a drawing of a 2-in-1 layout and 4-in-1 layout. The numbers 1 to 4 represent page number in the original. FIG. 10A is a drawing of eight originals in their stacking sequence and FIG. 10B is a drawing of a less expensive multi-page layout of the eight originals. FIG. 11 is an example of the color conversion table.

The creation of the color conversion table shown in FIG. 11 by the cost calculating unit 106 is described below with reference to FIGS. 10A, 10B, and 11.

The eight originals shown in FIG. 10A are arranged by the cost calculating unit 106 in the less expensive multi-page layout shown in FIG. 10B. The bracketed numbers 1 to 8 in FIG. 10A represent the originals 1 to 8, respectively.

The multi-page layout on the first sheet shown in FIG. 10A shows that Original 1 with index number 1 is a two-tone original (black and red), and Original 3 with index number 2 is also a two-tone original (blue and red). Therefore, the color conversion table is created with an entry "(3), Blue→Black" in the column Index 2, indicating that blue in Original 3 is to be converted to black. In the column Index 1 in the color conversion table, no entry is made against Original 1, indicating that no color conversion is required for Original 1.

In the multi-page layout on the second sheet, Original 4 with index number 1 is a single-tone original (red), and Original 5 with index number 2 is a two-tone original (blue and red). As the output will be only in two colors, no entries are made for color conversion against either of the Originals 4 and 5 in the color conversion table.

In the multi-page layout on the third sheet, Original 6 with index number 1 is a two-tone original (green and red), and Original 8 with index number 2 is a single-tone original (black). Therefore, an entry "(8), Black→Green" is made in the column Index 2 in the color conversion table, indicating that black in Original 8 is to be converted to green. In the column Index 1 in the color conversion table, no entry is made against Original 6, indicating that no color conversion is required for Original 6.

In the multi-page layout on the fourth sheet, both Original 2 with index number 1 and Original 7 with index number 2 are full color originals. Hence, as there is no necessity for color conversion, no entries for conversion are made in the Index columns in the color conversion table corresponding to the fourth sheet.

The color conversion table that indicates the originals' numbers and color conversion for each sheet is thus created.

If there is a cost difference in the arrangements of FIG. 10A and FIG. 10B, the cost calculating unit 106 next notifies the total multi-page layout cost, the difference in the cost, and the color conversion table to the control unit 107. If the cost difference is not zero, the control unit 107 reads those image data from the image storing unit 105 that require color conversion according to the color conversion table, and forwards those image data to the image processing unit 104. The selector 201 of the image processing unit 104 selects a path in such a way that the image data is channeled to the image processing block 302 shown in FIG. 2. A color modifying unit 205 in the image processing block 302 modifies the color of the image data according to the color conversion table and the image data is once again stored in the image storing unit 105.

After color conversion, the control unit 107 reads the image data stored in the image storing unit 105, arranges them in multi-page layout according to the color conversion table, and displays them as thumbnails in the display area of the operation panel 103, enabling the user to have a preview. The subsequent process flow is similar to that described in the first embodiment. The preview screen shown in FIG. 6 can be displayed in the display area of the operation panel.

The thumbnail images of the 2-in-1 layout are displayed in the preview window 602 in the preview screen 600 displays. All the sheets can be viewed by pressing the "previous" button 603 or the "next" button 604. The reshuffled sequence cost and the difference between the stacking sequence cost and the reshuffled sequence cost are displayed on the cost display unit 601. Thus, just by glancing at the preview screen the user can readily get information about the final multi-page layout and the cost thereof.

If acceptable, the user can go ahead with copying by pressing the "OK" button 606. If not, by pressing the "cancel" button 605 the user can cancel the operation.

If the user presses the "OK" button 606, the control unit 107 reads the image data from the image storing unit 105 such that the image data are output in the reshuffled and less expensive multi-page layout and forwards the image data in the same sequence to the image processing unit 104. The color converting unit 206 of the image processing block 303 shown in FIG. 2 converts the color space of the image data from the standardized color space to a color space suited to the printer 102, and the gradation processing unit 207 performs gradation processing. The gradation processing unit 207 forwards the image data to the selector 208, and the selector 208 forwards the image data to the printer 102. The image data is transferred to the recording sheets by the printer 102.

If the user presses the "cancel" button 605, the control unit 107 reads the image data from the image storing unit 105 such that the image data are output in a multi-page layout in the image reading sequence and forwards the image data in the same sequence to the image processing unit 104. The subsequent process flow is similar to that when the "OK" button 606 is pressed.

Thus, when performing multi-page copying of the originals, the cost of multi-page copying is calculated based on the attributes of the originals, and if a less expensive multi-page layout is possible, color conversion is carried out in the originals that require it, and the less expensive multi-page layout and the cost thereof are displayed on the preview screen, enabling the user to select the less expensive multi-page copying.

In a third embodiment of the present invention described below, cost reduction is achieved by saving toner when arranging the originals in a multi-page layout. Toner saving refers to reducing toner consumption by producing lighter images. The toner saving process is well known and hence description thereof is omitted.

The general structure of the image forming apparatus is similar to the one shown in FIG. 1 except the structure of the image processing unit 104. Concretely, the image processing unit 104 is replaced with an image processing unit 1104 shown in FIG. 12.

As described with reference to FIG. 1, when the user places a stack of originals in the document tray and presses the "start" button, the scanner 101 sequentially reads the originals and forwards the image data read from the originals to the image processing unit 1104.

FIG. 12 is a detailed block diagram of the image processing unit 1104. The image processing unit 1104 includes three image processing blocks 1301, 1302, and 1303. A selector 1201 controls to which of the image processing blocks 1301, 1302, and 1303 the image data received by the image processing unit 1104 is to be channeled. The selector 1201 first channels the image data received from the scanner 101 to the image processing block 1301.

In the first image processing block 1301, a color converting unit 1202 converts the image data from a device-dependent color space to a standardized color space (for example RGB space), and forwards the image data to a magnification changing unit 1203. The magnification changing unit 1203 changes the magnification of the image data according to whether it is a 2-in-1 layout or a 4-in-1 layout. The resulting reduced image data is stored in the image storing unit 105 via a selector 1207.

The cost calculating unit 106 calculates the cost of print output on a recording sheet based on the multi-page layout information (information concerning whether the layout is a 2-in-1 layout or a 4-in-1 layout) from the operation panel 103 and an output cost preset for toner saving mode.

Assume that the rate for single-tone copying and two-tone copying is A, for full color copying is B, and in toner saving mode is C, and that B>C>A. Thus, copying in toner saving mode will work out cheaper than full color copying.

Calculation of cast for the multi-page layout shown in FIGS. 4A to 4C in case of the third embodiment is explained below. Suppose that the four originals in FIG. 4A are to be output in a 2-in-1 layout. Out of the four, two are full color (FC) and two are single-tone (1C). The stacking sequence of the originals are as shown in FIG. 4A.

If the originals are arranged in a multi-page layout according to the stacking sequence as shown in FIG. 4B, the layout on the first sheet will be (FC and 1C), and on the second sheet will be (FC and 1C). The output cost depends on the number of color output per page and the number of colors is determined by the attribute of the original. Thus, the cost of output for the first sheet (FC and 1C) will be B and the cost of output for the second sheet (FC and 1C) will also be B. Thus, the total cost for the output of the two sheets will be (B+B).

If the pages are reshuffled before arranging them in a multi-page layout as shown in FIG. 4C, the cost of first sheet, which is (1C and 1C), will be A, and the cost of second sheet, which is (FC and FC), will be B. Thus, the total cost for the output of the two sheets will be (A+B).

If the second sheet is output in toner saving mode, for which the applicable rate is C, which is lower than the rate B, the cost would be cheaper than for the multi-page layout shown in FIG. 4B by (B+B−A−C).

The cost calculating method for toner saving mode will be the same as explained in the first embodiment except that rate B will be replaced by rate C. In other words, let us suppose that the number of pages per sheet is N (N=2 in a 2-in-1 layout), and the number of originals for which rate A is applicable (single-tone and two-tone originals) is M_a, and the number of originals for which rate C is applicable (full-color originals) is M_c.

If (M_a/N≧1), a cheaper output cost is possible by assembling all the originals for which rate A is applicable on a single sheet. The quotient of division of M_a by N (which is S) will be the number of sheets required for outputting the groups of originals for which rate A is applicable. The quotient of division of M_c by N (which is supposed as T) will be the number of sheets required for outputting the groups of originals for which rate C is applicable.

The calculation of cost for arranging in multi-page layout the remaining originals (M_a+M_c−(S+T)×N) will be different based on whether or not (M_a+M_c−(S+T)×N) is divisible by N. A fractional quotient in a 2-in-1 layout indicates that there will be only one page left to be arranged on the last sheet. A fractional quotient in N-in-1 layout indicates that there will be N−1 or less pages left to be arranged on the last sheet.

(1) A whole number quotient means that the remaining number of originals Z (=M_a+M_c−(S+T)×N) is divisible by N. The cost of copying the remaining originals is calculated by (Z/N×C). The total cost is calculated by (S×A+T×C+Z/N×C).

(2) A fractional number quotient means that the remaining number of originals Z (=M_a+M_c−(S+T)×N) is not divisible by N. The number of originals remaining (assumed to be U) is the quotient of Z by N. In other words, (U=Z/N). The multi-page layout cost calculation method will be different for U≦(M_a−S×N) and U>(M_a−S×N).

(2-1) If U≦(M_a−S×N), the multi-page layout will fall under rate A, and the rate applicable to the multi-page layout corresponding to the fraction will be rate A. Rate C automatically becomes applicable to multi-page layout of the last remaining originals (Z−U). Therefore, the total multi-page layout cost would be (S×A+T×C+A+(Z−U)/N×C).

(2-2) If U>M_a−S×N, the multi-page layout will not fall under rate A, and therefore the rate applicable to the multi-page layout corresponding to the fraction will be rate C. Rate C automatically becomes applicable to multi-page layout of the last remaining originals (Z−U). Therefore, the total multi-page layout cost would be (S×A+T×C+C+(Z−U)/N×C).

Thus, by reshuffling the originals when performing multi-page copying, and arranging in a multi-page layout the full-color originals for which full-color rate would be applicable in the toner saving mode, cost reduction can be achieved as compared to multi-page copying performed in the stacking sequence of the originals.

The cost calculating unit 106 notifies the control unit 107 the multi-page layout cost for toner saving mode, the difference between the cost in stacking sequence and reshuffled sequence in toner saving mode, as well as the sequence of the originals reshuffled for inexpensive multi-page copying and the originals that are meant for toner saving. The control unit 107 reads the originals meant for toner saving from the image storing unit 105 and forwards the image data to the image processing unit 1104. The selector 1201 of the image processing unit 1104 selects a path in such a way that the image data is channeled to the image processing block 1302 shown in FIG. 12. A toner saving processor 1204 of the image processing block 1302 performs a toner saving process on the concerned image data, and the image data is once again stored in the image storing unit 105 via the selector 1207.

The control unit 107 reads the image data stored in the image storing unit 105 in the sequence in which they are to be arranged in the multi-page layout and displays them as thumbnails in the display area of the operation panel 103, enabling the user to have a preview and decide whether or not to select the less expensive multi-page layout.

Thus, by calculating the reshuffled sequence cost based on the attributes of the originals and using the toner saving mode, and displaying the multi-page layout and the multi-page layout cost on the preview screen, the user is given the option to perform a less expensive copying operation.

The three embodiments described above are concerning methods of arriving at multi-page layout that afford the user with the option of selecting a less expensive copying operation. It is also possible to provide the methods described in the second and third embodiments together, presenting the user with the multi-page layouts and costs of both on the preview screen, and enabling the user to select the method of their choice.

A "cost preference" button could be provided in the operation panel, which in switched off mode, will enable multi-page layout display in stacking sequence, and in switched on mode will enable a less expensive multi-page layout in a reshuffled sequence, and if there are several inexpensive options, will allow the user to select the least expensive among them.

The functions described in the first to third embodiments can be realized by a computer program such as a multi-page layout cost calculation program stored in the ROM 108 shown in FIG. 1 and executed by the image forming apparatus. The multi-page layout cost calculation program can also be stored in a computer-readable recording medium and read therefrom to attain the same result. By storing the computer program in a recording medium, portability of the program is further enhanced. The recording medium can be magnetic or optic.

An image forming apparatus is presented that can provide the user with preferred multi-page layout.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an attribute determining unit that determines an attribute concerning a hue of originals;
   a multi-page layout unit configured to arrange image data of the originals on a single sheet thereby obtaining a multi-page layout; and
   a cost calculating unit that calculates a printing cost of the originals,
   wherein the cost calculating unit calculates the printing cost for the multi-page layouts of different combinations of the image data of the originals arranged by the multi-page layout unit based on an outcome of determination by the attribute determining unit, and
   wherein the multi-page layout unit is further configured to reduce a number of colors by performing color conversion on at least one image data from among the image data of the originals before arranging the image data of the originals on the single sheet.

2. The image forming apparatus according to claim 1, wherein the multi-page layout unit reshuffles the originals before arranging the image data of the originals on the single sheet.

3. The image forming apparatus according to claim 1, wherein the attribute determining unit determines the attribute of the originals to distinguish between a single-tone original, a two-tone original, and a full color original based on the number of constituent colors of the originals, and determines the attribute of the single-tone original and the two-tone original based on a hue of the constituent color thereof.

4. The image forming apparatus according to claim 1, wherein the multi-page layout unit performs a toner saving process on at least one image data from among the image data of the originals before arranging the image data of the originals on the single sheet.

5. The image forming apparatus according to claim 1, further comprising
   a display unit that displays a preview of the printing cost calculated by the cost calculating unit; and
   a selecting unit that enables a user to select one multi-page layout method from among a plurality of different multi-page layout methods.

6. A non-transitory computer program product that includes computer program codes stored on a computer readable recording medium that when executed on a computer enables the computer to execute:
   determining an attribute concerning a hue of originals;
   arranging image data of the originals on a single sheet thereby obtaining a multi-page layout; and
   calculating a printing cost of the originals,
   wherein the calculating includes calculating the printing cost for the multi-page layouts of different combinations of the image data of the originals arranged at the arranging based on an outcome of determination at the determining, and further comprising
   reducing a number of colors by performing color conversion on at least one image data from among the image data of the originals before arranging the image data of the originals on the single sheet.

7. An image forming method comprising:
   determining an attribute concerning a hue of originals;
   arranging image data of the originals on a single sheet thereby obtaining a multi-page layout; and
   calculating a printing cost of the originals,
   wherein the calculating includes calculating the printing cost for the multi-page layouts of different combinations of the image data of the originals arranged at the arranging based on an outcome of determination at the determining, and
   wherein the method further comprises reducing a number of colors by performing color conversion on at least one image data from among the image data of the originals before arranging the image data of the originals on the single sheet.

* * * * *